(12) United States Patent
Sardi et al.

(10) Patent No.: US 11,512,770 B2
(45) Date of Patent: Nov. 29, 2022

(54) GEARBOX ASSEMBLY

(71) Applicant: Ratier-Figeac SAS, Figeac (FR)

(72) Inventors: Adil Sardi, Capdenac (FR); Sébastien Caminade, Béduer (FR); Frédéric Vermande, Figeac (FR); Eric Delbos, Lacapelle-Marival (FR)

(73) Assignee: RATIER-FIGEAC SAS, Figeac (FR)

( * ) Notice: Subject to any disclaimer, the term of this patent is extended or adjusted under 35 U.S.C. 154(b) by 191 days.

(21) Appl. No.: 16/950,220

(22) Filed: Nov. 17, 2020

(65) Prior Publication Data

US 2021/0071749 A1 Mar. 11, 2021

Related U.S. Application Data

(63) Continuation-in-part of application No. 15/672,444, filed on Aug. 9, 2017, now abandoned.

(30) Foreign Application Priority Data

Oct. 10, 2016 (EP) ..................................... 16306336

(51) Int. Cl.
*F16H 57/03* (2012.01)
*F16H 1/22* (2006.01)
*F16H 57/021* (2012.01)
*F16H 57/02* (2012.01)
*B64D 35/00* (2006.01)
*B64D 41/00* (2006.01)

(52) U.S. Cl.
CPC ............... *F16H 57/03* (2013.01); *F16H 1/22* (2013.01); *F16H 57/021* (2013.01); *B64D 35/00* (2013.01); *B64D 41/00* (2013.01); *F16H 2057/02082* (2013.01)

(58) Field of Classification Search
CPC ........ F16H 57/037; F16H 57/02; F16H 57/03; F16H 2057/0081; F16H 37/0813
See application file for complete search history.

(56) References Cited

U.S. PATENT DOCUMENTS

| 3,183,043 | A | 5/1965 | Creeger et al. |
| 4,742,730 | A | 5/1988 | Dorn et al. |
| 5,042,321 | A | 8/1991 | Hongo |
| 5,070,830 | A | 12/1991 | Malven |
| 7,186,198 | B2 | 3/2007 | Selva, Jr. |
| 8,657,716 | B1 | 2/2014 | Whyte |
| 10,295,044 | B2 * | 5/2019 | Wilkins .................. F16H 57/03 |

(Continued)

FOREIGN PATENT DOCUMENTS

| DE | 3441699 A1 | 5/1986 |
| EP | 0866926 A1 | 9/1998 |

(Continued)

OTHER PUBLICATIONS

Extended European Search Report for European Patent Application No. 16306336.5 dated Apr. 13, 2017, 9 pages.

*Primary Examiner* — Jeremy R Severson
(74) *Attorney, Agent, or Firm* — Cantor Colburn LLP

(57) ABSTRACT

A gearbox assembly comprising a plurality of component parts in torque transmission connection via gear, shaft and/or housing components; the assembly further comprising means for providing redundancy at selected locations where failure can lead to loss of torque transmission between component parts of the assembly.

10 Claims, 24 Drawing Sheets

(56) References Cited

U.S. PATENT DOCUMENTS

| | | | |
|---|---|---|---|
| 10,598,268 B2* | 3/2020 | Nakajima | ............ F16H 57/037 |
| 2004/0214682 A1 | 10/2004 | Sbabo | |
| 2005/0130792 A1 | 6/2005 | Drago et al. | |
| 2007/0219044 A1 | 9/2007 | Waide | |
| 2014/0073471 A1 | 3/2014 | Whyte et al. | |
| 2018/0100575 A1 | 4/2018 | Sardi et al. | |

FOREIGN PATENT DOCUMENTS

| | | |
|---|---|---|
| WO | 9722817 A1 | 6/1997 |
| WO | 2011096913 A1 | 8/2011 |

* cited by examiner

GEARBOX ASSEMBLY

PRIORITY

This application is a continuation in part of U.S. application Ser. No. 15/672,444 filed Aug. 9, 2017 which claims priority to European Patent Application No. 16306336.5 filed Oct. 10, 2016, the entire contents of both are incorporated herein by reference.

TECHNICAL FIELD

The present invention relates to gearbox assemblies, especially, but not exclusively, for aircraft.

BACKGROUND

Gearbox assemblies are provided in e.g. aircraft where aircraft parts, accessories, actuators are driven by power from the aircraft engine(s) via alternators and/or hydraulic pumps. Power from the aircraft engine drives alternators and/or hydraulic pumps and electrical and/or hydraulic power then powers actuators/electrical or hydraulic motors etc.

The rotational velocity of the motor is greater than that required or desired to drive the components, actuators, etc. and so a gearbox reduces or steps down the rotational velocity of the motor to a velocity suitable for the driven load. The gearbox reduces the rotational velocity using a number of intermeshed gears between the motor and a drive output to the parts to be driven. In reducing the rotational velocity of the motor output, torque is increased through the series of gear stages and associated shafts.

Such gearbox assemblies are used e.g. with actuators to control wing flaps, landing gear, tail flaps, Horizontal Stabilizer Trim Actuators (HSTA) also known as trimmable horizontal stabilizer actuators (THSAs) etc.

Gearbox actuator systems may be provided with brake mechanisms that prevent complete failure in the event of fracture of the power transmission shaft from the engine. One solution is known as no-back irreversibility brakes or NBB. This, in the event of shaft fracture, causes high deceleration followed by standstill, with excess kinetic energy dissipated by losses of the rotating shafts.

Such gearbox and transmission systems provide crucially important functions in aircraft, and failure of all or part of the system can be catastrophic. It is important, therefore, to perform regular and frequency safety inspections and maintenance on the many parts that make up these mechanically complex systems. This is, of course, costly and time consuming, but necessary for safety.

It is well-known that there a locations or components in a gearbox that are more vulnerable to failure than others.

It is an object of this disclosure to provide a gearbox assembly which is less vulnerable to catastrophic failure, without the need to increase safety inspections and maintenance.

SUMMARY

The present disclosure provides a gearbox assembly with means for providing redundancy at selected locations where failure can lead to loss of torque transmission between component parts of the assembly.

This redundancy is preferably provided at locations where fracture is more likely to occur—i.e. at locations known to be more vulnerable to fracture, or where bearings exist, as bearings are also known to be common failure points.

Increased vulnerability has been identified in the following gearbox locations:

The meshing between the bull gear and the jackshaft: this can be due to a horizontal crack in the casing e.g. in the NBB section; a vertical crack in the casing, or due to a jackshaft bearing failure.

The meshing between the jackshaft and the differential line; this may be due to a vertical crack in the casing or failure of the main shaft bearings.

Loss of transmission between the differential line, the jackshaft and the input shaft: this can be due to differential line bearing failure, a crack in the casing at brake interface level, or a crack in the cover at the motor interface level.

A longitudinal crack in the casing.

Bearing failures in the motors shafts.

If any of these failures occur, there will be a loss of transmission between parts of the assembly and so a break in the power transmission from the motor to the load to be driven; such a failure can also lead to a loss of NBB irreversibility thus leaving the system with no fail-safe in the event of damage to the transmission shaft.

Most preferably, redundancy is provided by providing a reinforcement component across two component parts between which a crack or failure would cause loss of torque transmission.

The reinforcement could be a plate or bracket to hold the torque transmitting components together in the event of a failure occurring in the gearbox assembly between them.

In the case of bearing failure, a possible way of providing redundancy is to provide secondary bearings that kick in when a primary bearing fails.

BRIEF DESCRIPTION OF THE DRAWINGS

Preferred embodiments will now be described with reference to the drawings, wherein.

DETAILED DESCRIPTION

Figure 1:
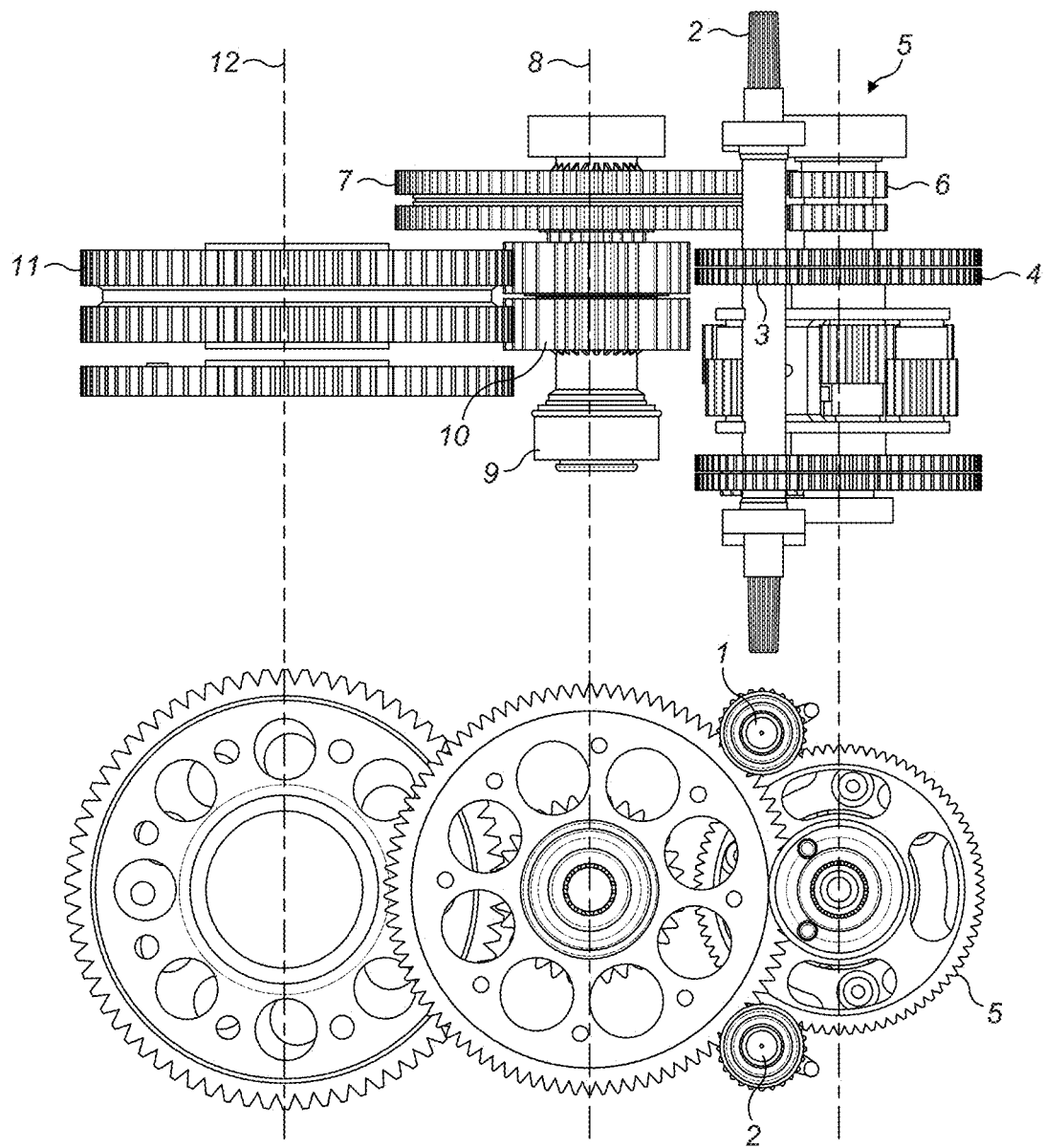
FIG. 1 shows a perspective and partly exploded view of a typical gearbox assembly.

With reference to FIG. 1, a typical gearbox assembly comprises an input transmission shaft from the engine. In this case, there are two input shafts—a right channel input shaft 1 and a centre channel input shaft 2. These shafts are provided with toothed wheels 3 that are in meshing engagement with toothed wheels 4 of a differential line gear stage 5. The differential line gear stage has further toothed wheels 6 in meshing engagement with toothed wheels 7 of a jackshaft gear stage 8 through which a jackshaft 9 passes. The jackshaft stage has toothed wheels 10 in meshing engagement with toothed wheels 11 of a bull gear stage 12.

The intermeshing gear stages thus reduce the rotational velocity from the engine, attached to the input shafts 1, 2, transmitting torque through the gear stages to drive the load at the gearbox output.

Figure 2:
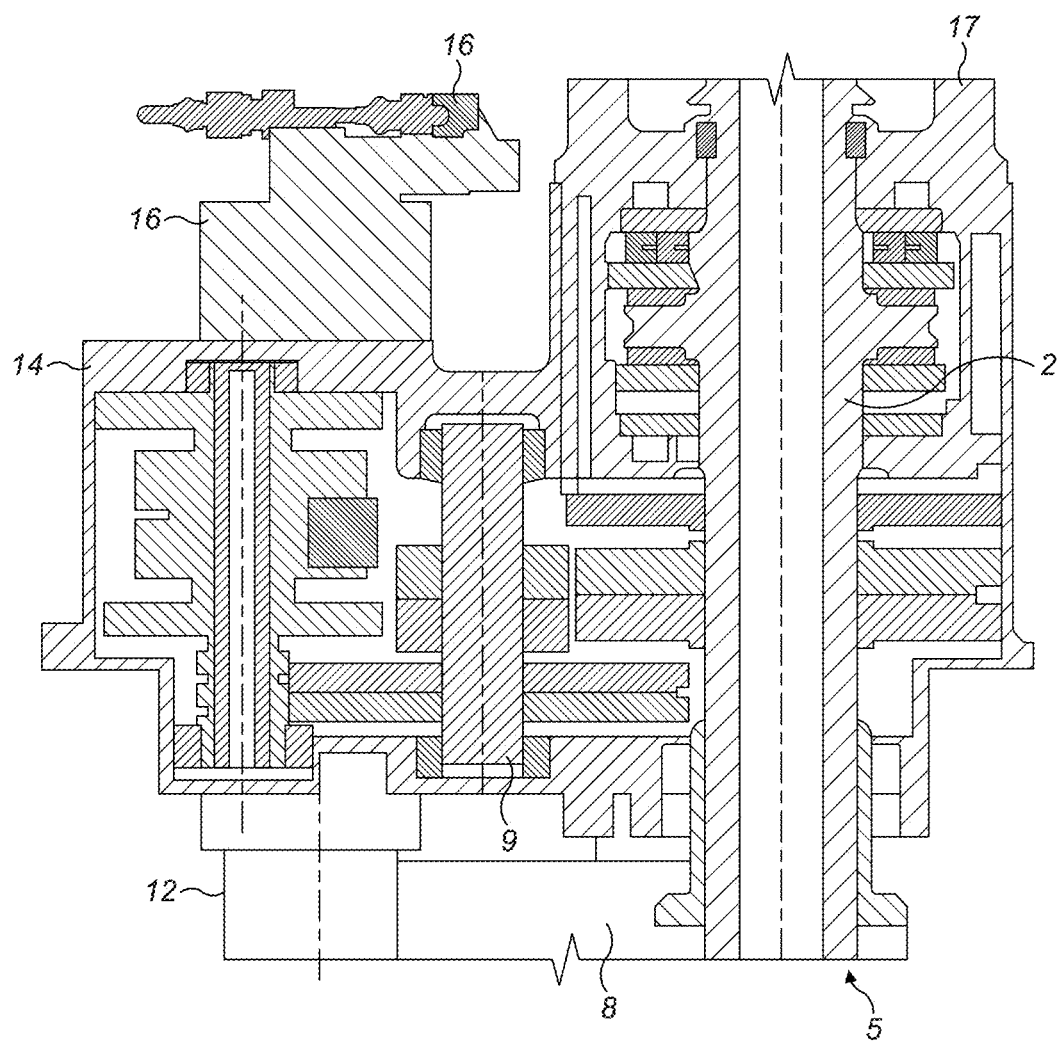
FIG. 2 shows a sectional view of a typical gearbox assembly.

These components can be seen in the cross-section of FIG. 2 which also shows that bearings are provided for the rotating shafts.

Figure 3:
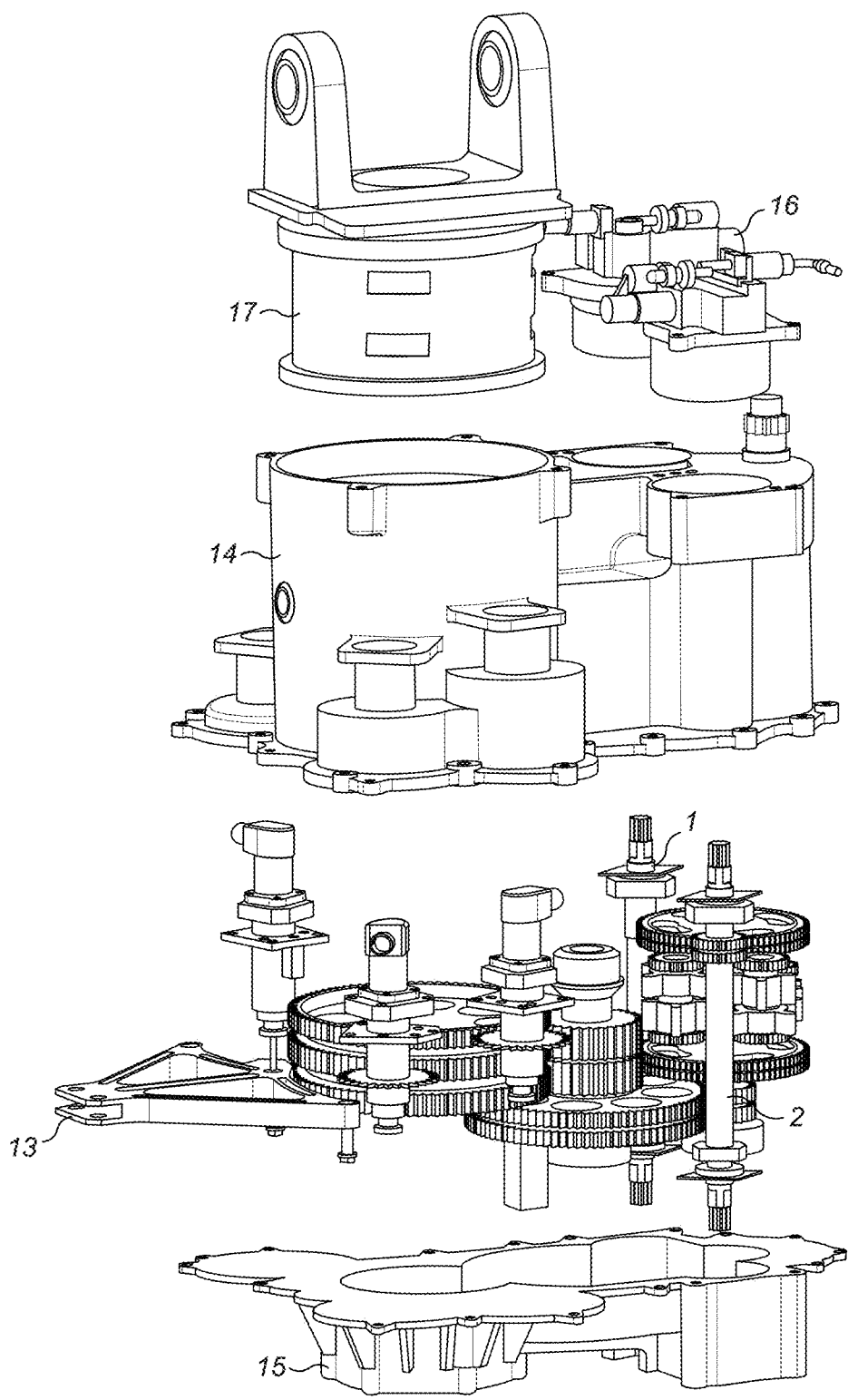
FIG. 3 is an exploded perspective view of the assembly of FIG. 2.

These gear assembly components (collectively 13) are, as shown most clearly in the exploded view of FIG. 3, mounted in a casing 14 which is closed at the bottom by a cover 15. At the top is provided the POB (pressure off brake) arrangement and the NBB arrangement within respective housings 16, 17.

As mentioned above, various locations/parts of such a gearbox assembly have been identified as being potential points of single failure, whereby a single failure can lead to a loss of torque transmission.

These points are identified in FIGS. 4A and 4B as follows:
a. Bull gear vs. jackshaft meshing
1. Casing failure (horizontal crack—NBB section)
2. Casing failure (vertical crack)
3. Bearings failure (jackshaft)
b. Jackshaft vs. differential line meshing
4. Casing failure (vertical crack)
5. Bearing failures (main shaft)
c. Differential line vs. jackshaft vs. input shaft
6. Bearing failures (differential input)
7. Casing failure (crack at POB interface level)
8. Cover failure (crack at motor interface level)
a+b+c bull gear vs. jackshaft vs. differential line meshings
9. Casing failure (longitudinal crack)
d. Hydraulic input shafts vs. differential line
10. Bearing failures (hydraulic motor shafts)

According to the present disclosure, redundancy is provided at one or more of these potential points of single failure such that should the failure occur, there will be no loss (or no complete loss) of torque transmission between the respective gearbox parts.

As a general point, where the potential failure is a crack, the redundancy provided is a means to avoid separation between the parts of the system that would be separated by the crack. In the embodiments shown, this is provided by a bracket or plate but some other form of reinforcement or bridging could provide the redundancy.

For bearing failures, secondary or additional bearings are provided as a back-up in the event of failure of the primary bearing.

The various potential failure points and means of providing redundancy will now be discussed in turn with reference to FIGS. 5 to 15.

Figure 4A:
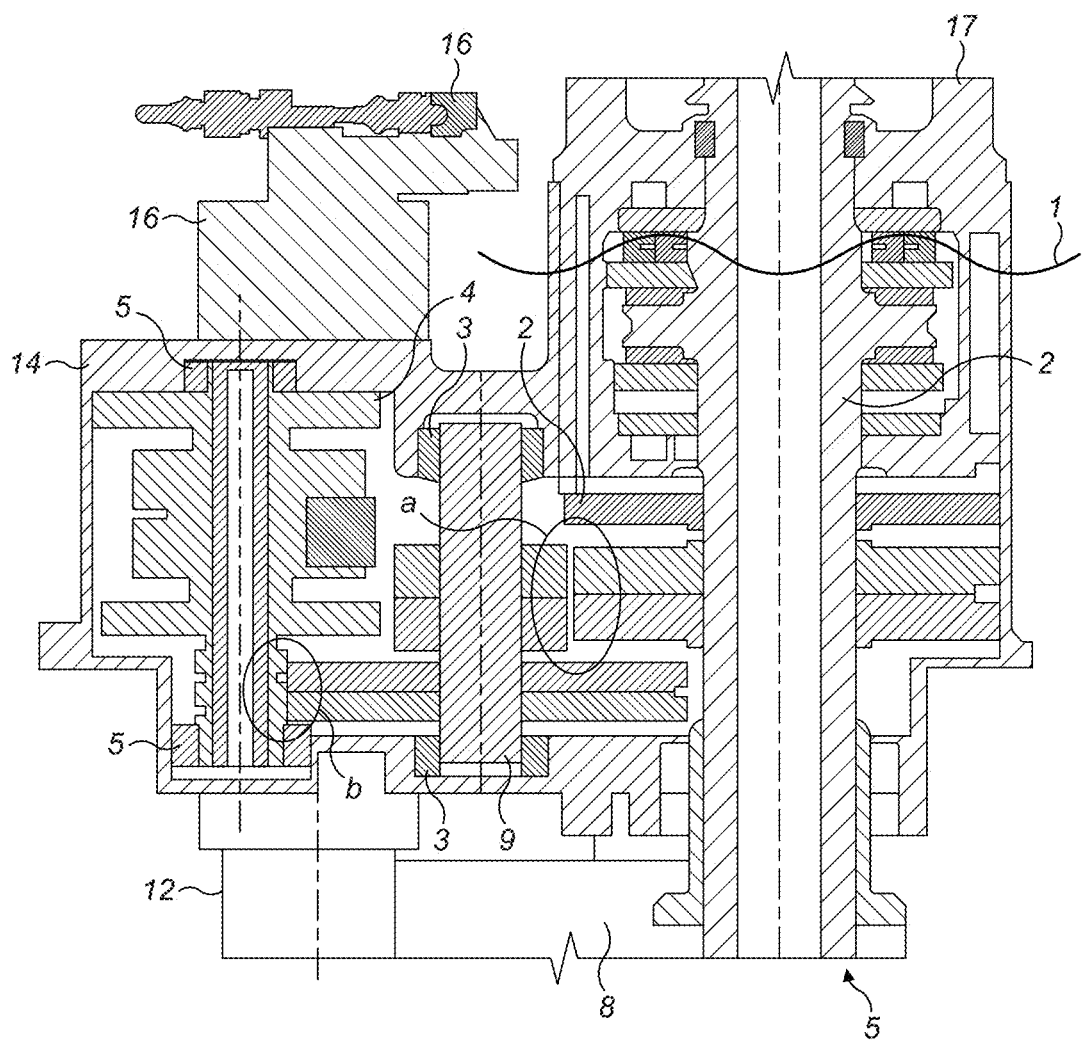
FIG. 4A is the view of FIG. 2 showing points of vulnerability.
Figure 4B:
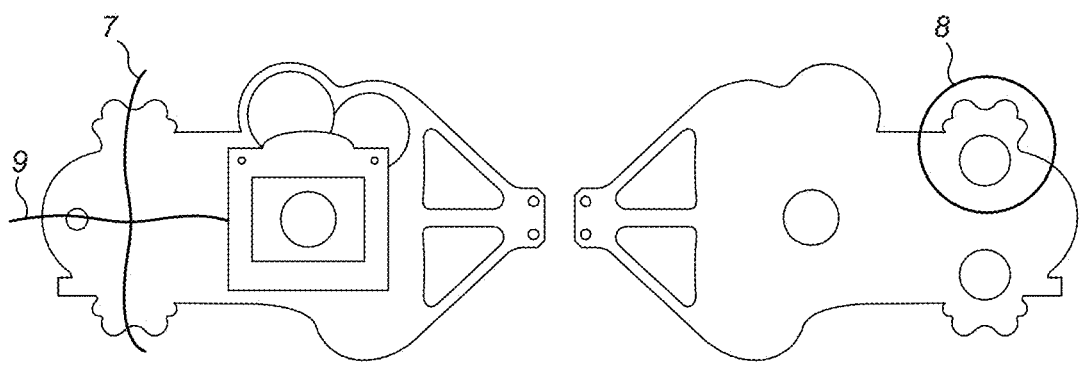
FIG. 4B shows further points of vulnerability.
Figure 5A:
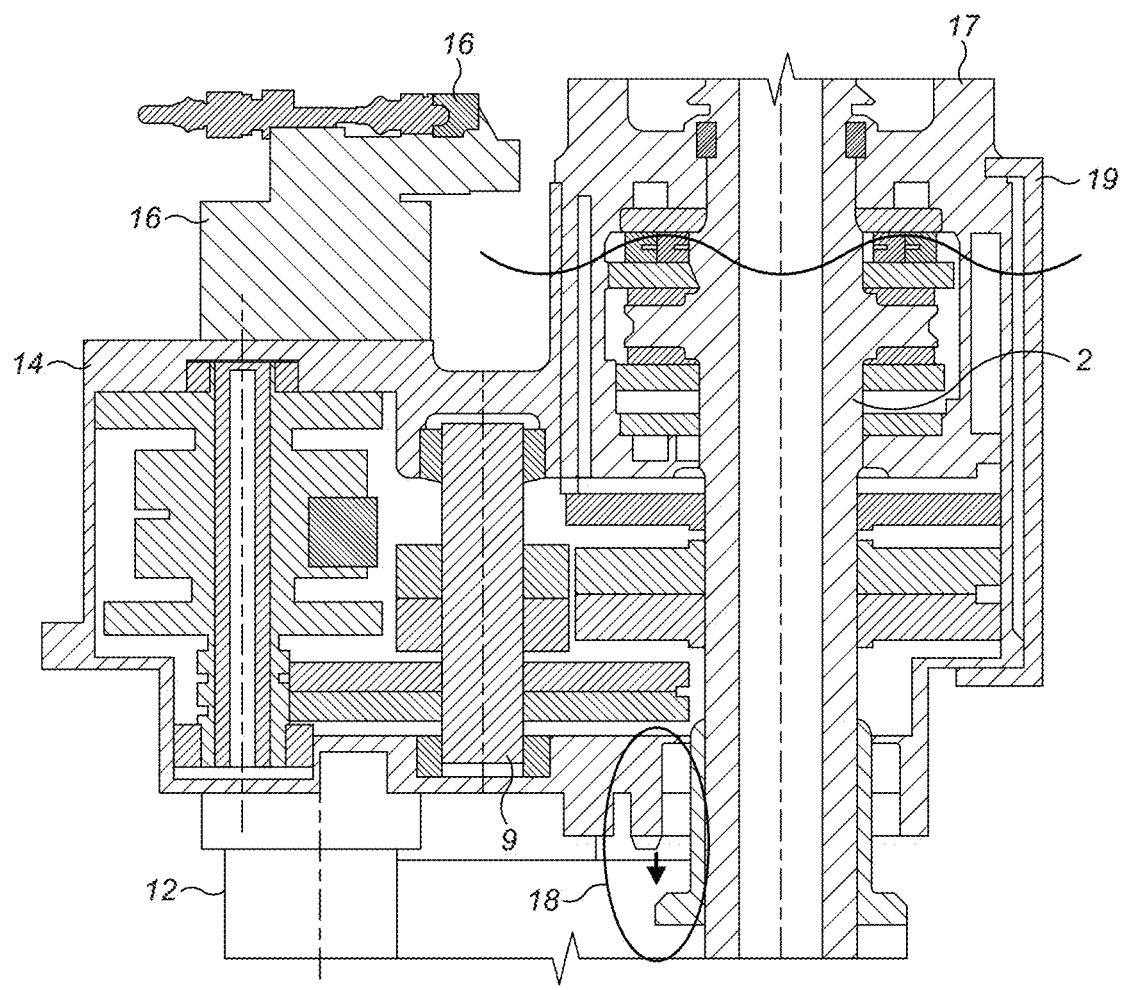
FIG. 5A is the view of FIG. 4 incorporation a solution of this disclosure to a horizontal crack in the casing.
Figure 5B:
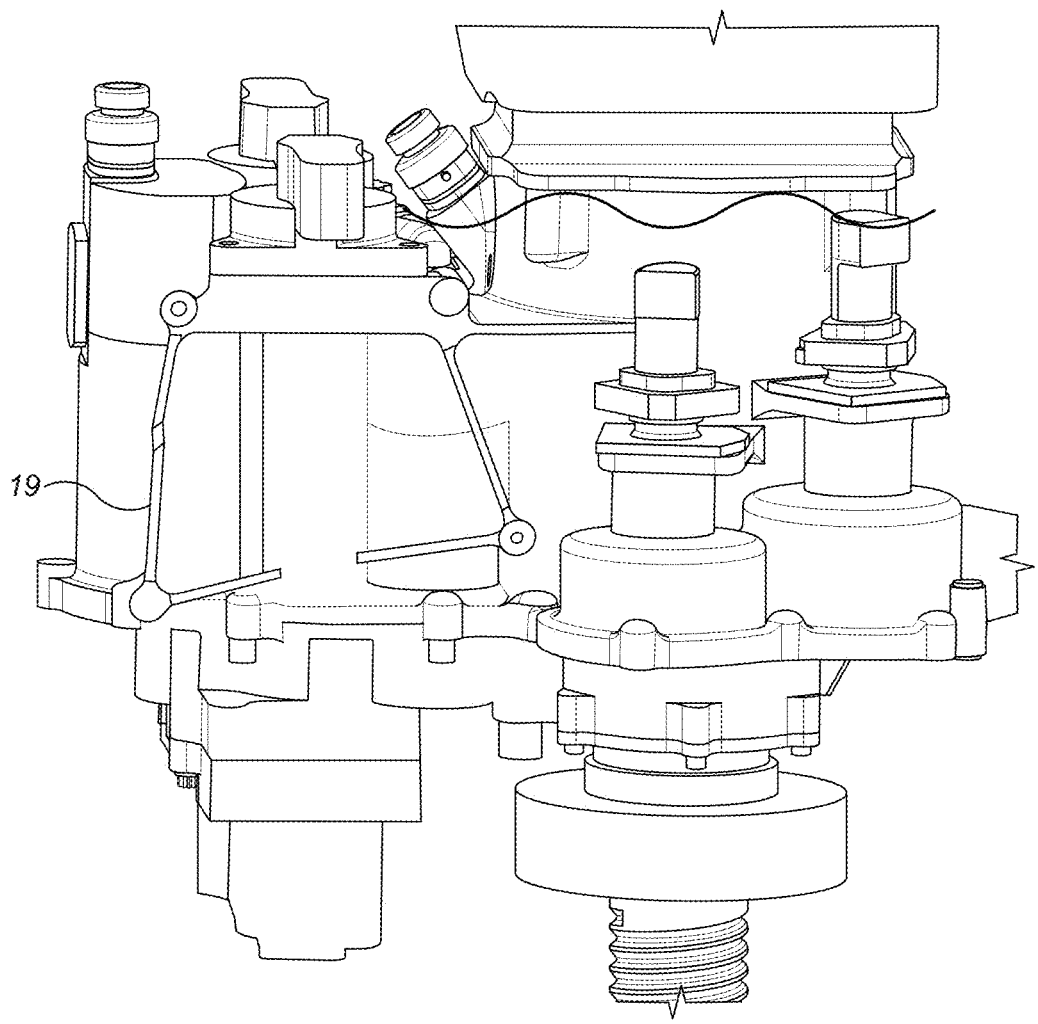
FIG. 5B is a perspective view of the solution of FIG. 5A.

FIG. 5A shows where a horizontal casing crack might occur, corresponding to failure 1 of FIG. 4A. This could prevent meshing between the bull gear and the jackshaft and prevent torque transmission at this point. FIGS. 5A and 5B show two possible solutions. In a first solution, redundancy is provided by locating a claw stop 18 at a distance from the moveable part of the main stage to limit any vertical shifting; cables can also be attached in a manner to prevent rotation at the crack. FIG. 5B shows a solution that can be provided as an alternative or additional means of providing redundancy, wherein a bracket 19 or plate (an external bracket in the examples) is provided to link the NBB housing 17 to the assembly cover 15.

Figure 6A:
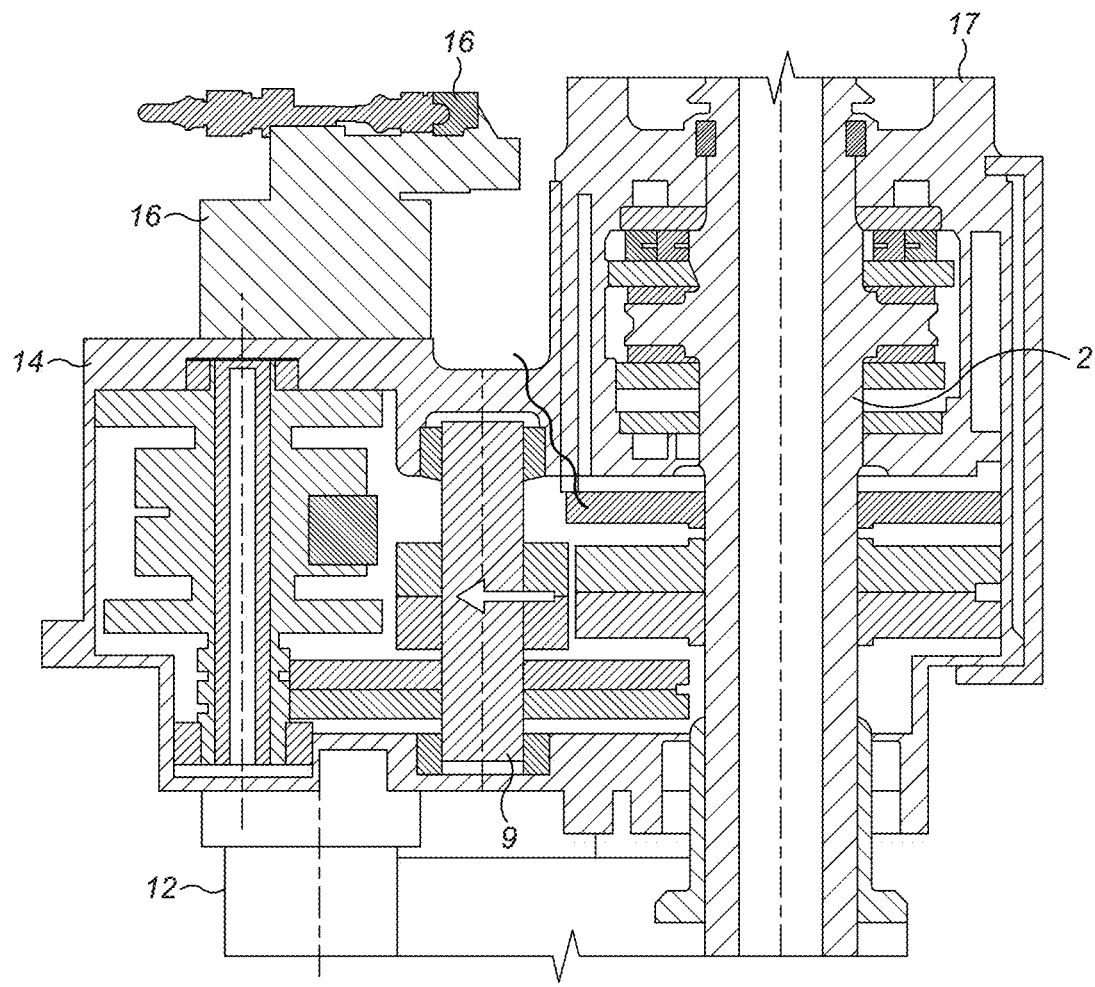
FIG. 6A is the view of FIG. 4 incorporation a solution of this disclosure to a vertical crack in the casing.
Figure 6B:
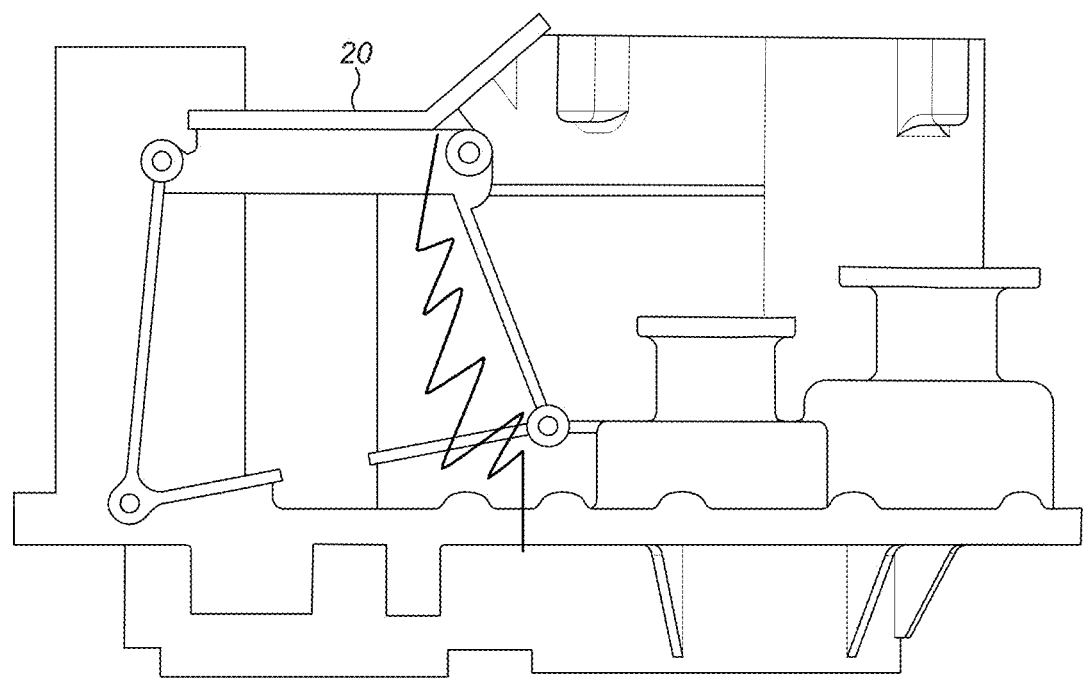
FIG. 6B is a perspective view of the solution of FIG. 6A.
Figure 7:
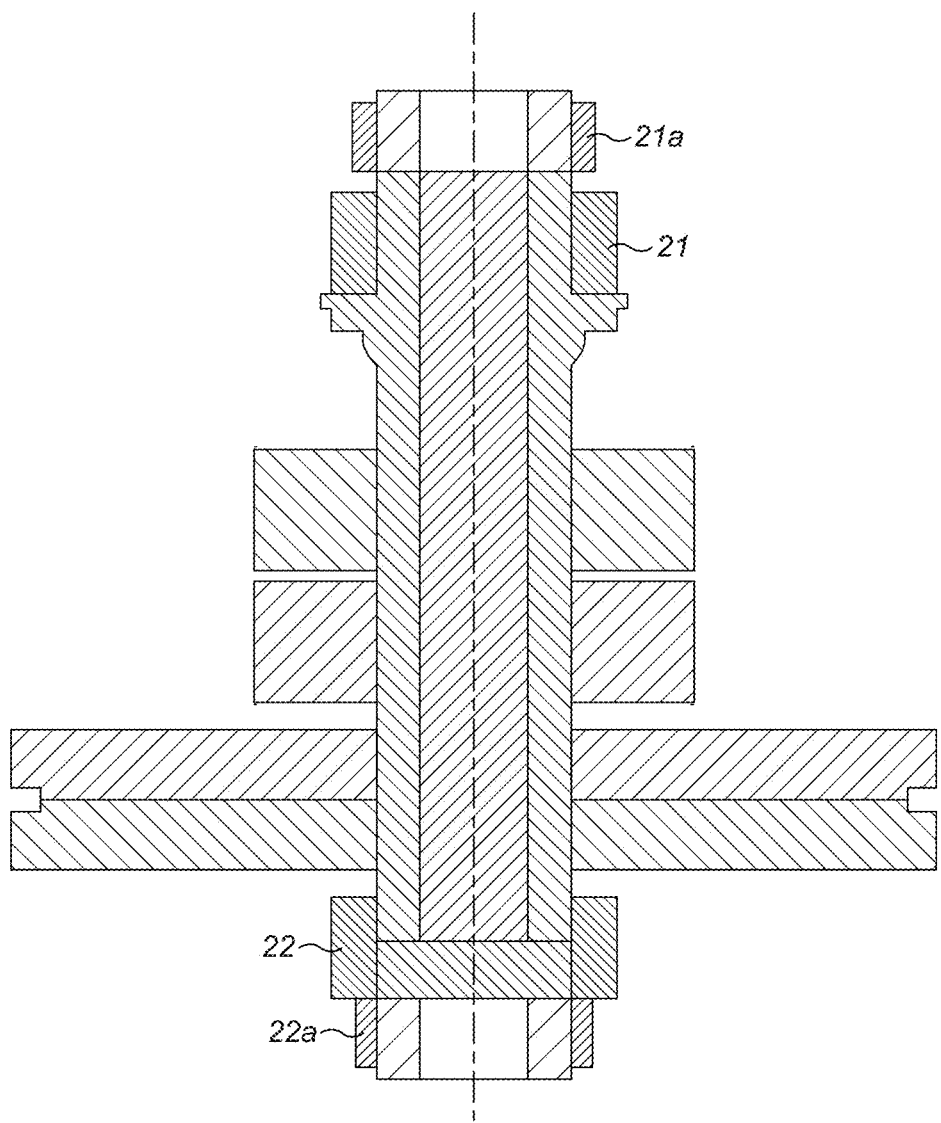
FIG. 7 shows a solution of this disclosure to a potential bearing failure.

FIGS. 6A and 6B show the situation identified by failure 2 in FIG. 4A where there is a vertical crack in the casing and can also prevent meshing between the bull gears and the jackshaft. One solution would be to add redundancy in the form of a top cover across the location where the crack could occur. An alternative or additional solution is to provide a bracket 20 at the top of the assembly linking the NBB housing 17 to the top of the assembly casing 14 as seen in FIG. 6B FIG. 7 shows a solution to the bearing failure 3 at the jackshaft. The primary bearings are shown at 21 and 22. To provide redundancy, the shaft is extended in the axial direction and provided with unloaded secondary bearings 21a, 22a integrated with the shaft. In the event of failure of one or more of the primary bearings, the backlash effect will be prevented or reduced by the secondary bearings coming into play.

Figure 8A:
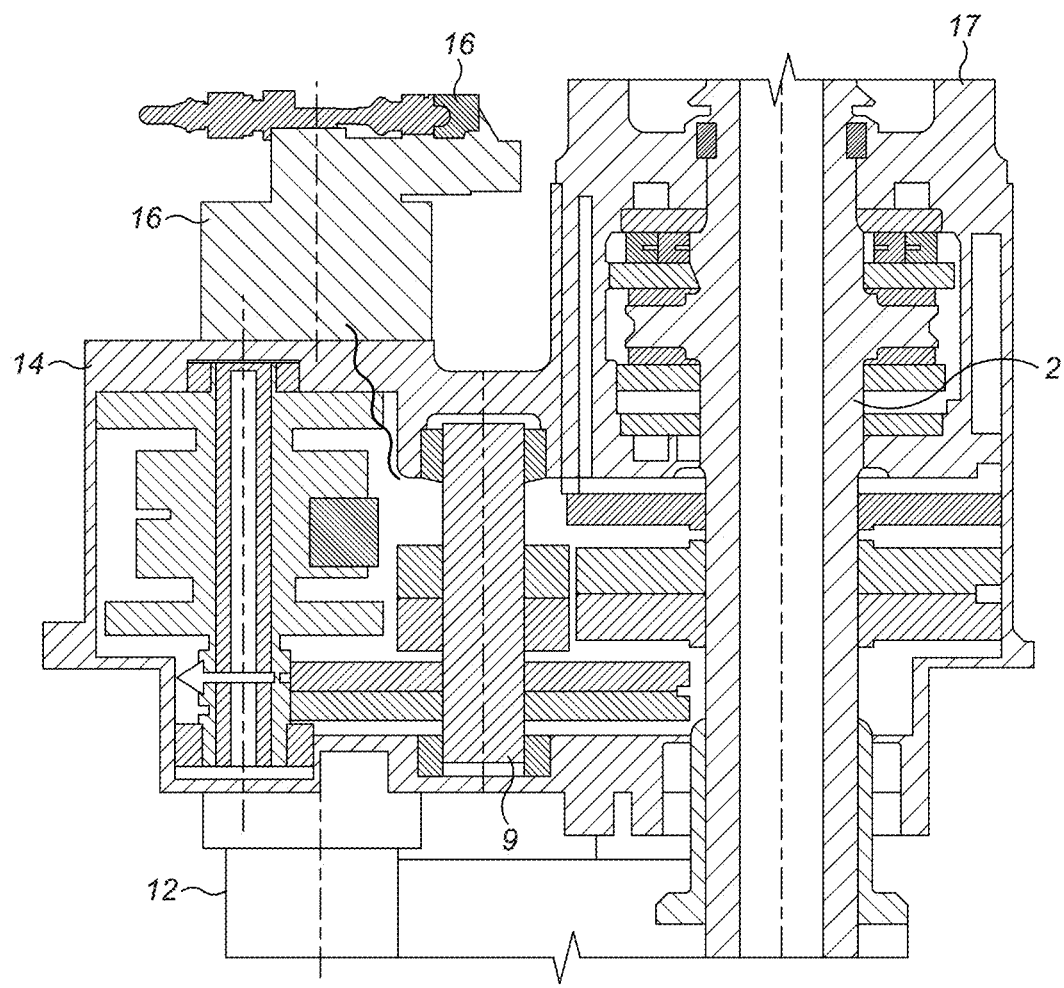
FIG. 8A is the view of FIG. 4 incorporation a solution of this disclosure to a crack in the casing.
Figure 8B:
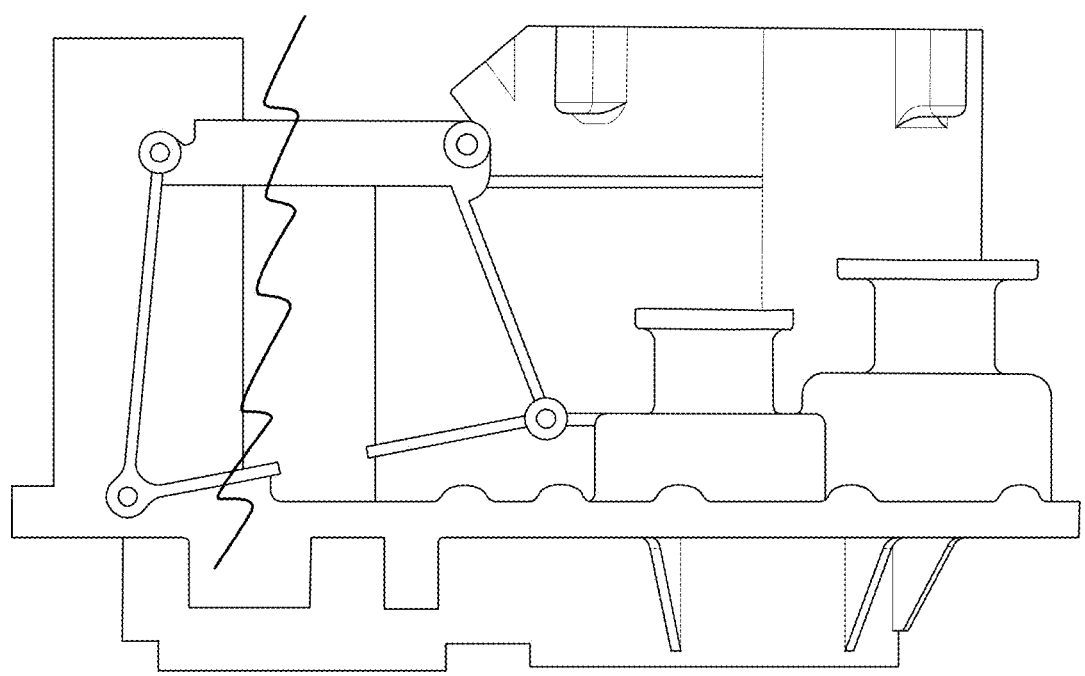
FIG. 8B is a perspective view of the solution of FIG. 8A.

FIGS. 8A and *b show the situation identified by failure 4 in FIG. 4A where there is potential for a vertical crack in the casing in the jackshaft stage 8 which can prevent meshing between the jackshaft stage and the differentia line stage. The solutions mentioned and shown in FIGS. 6A and 6B would be appropriate here too.

Figure 9:
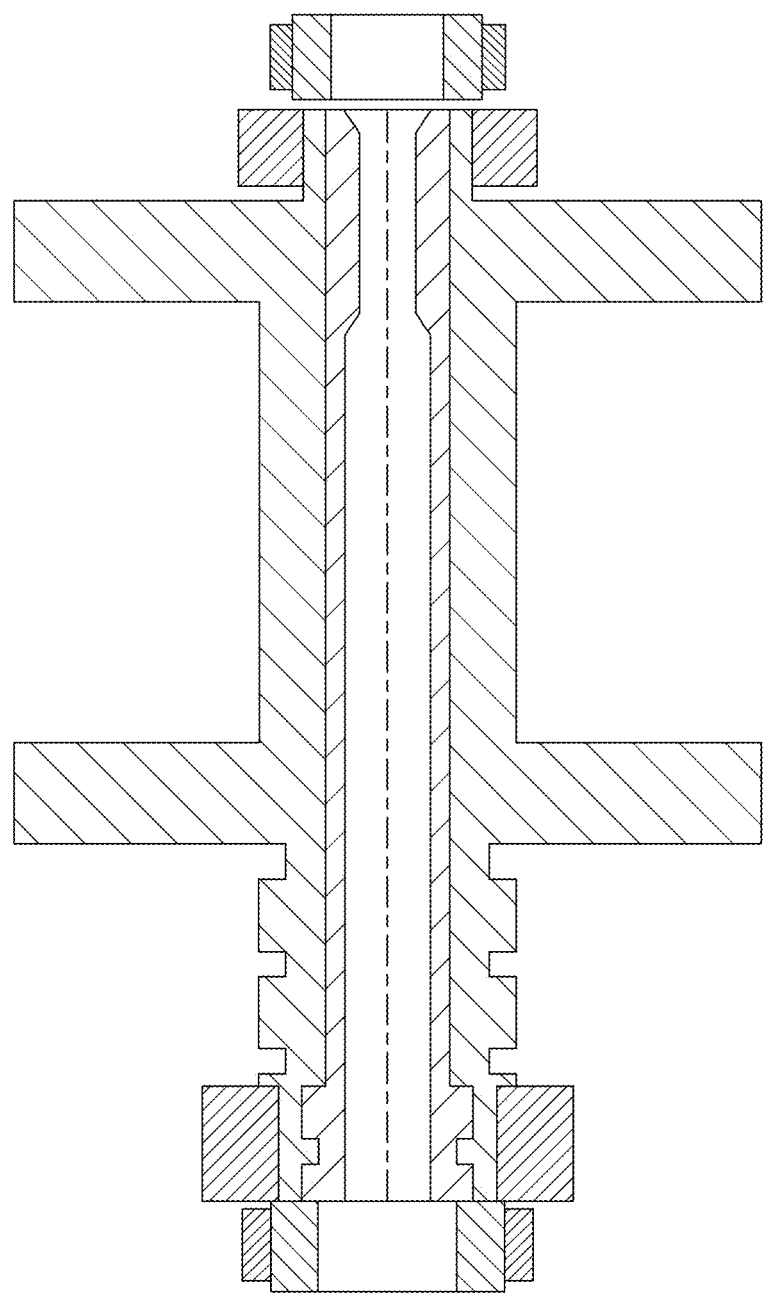
FIG. 9 shows a solution to a potential bearing failure.

FIG. 9 shows the situation for bearing failure 5 of FIG. 4A. Redundancy can be provided in the same way as described in relation to FIG. 7.

Figure 10:
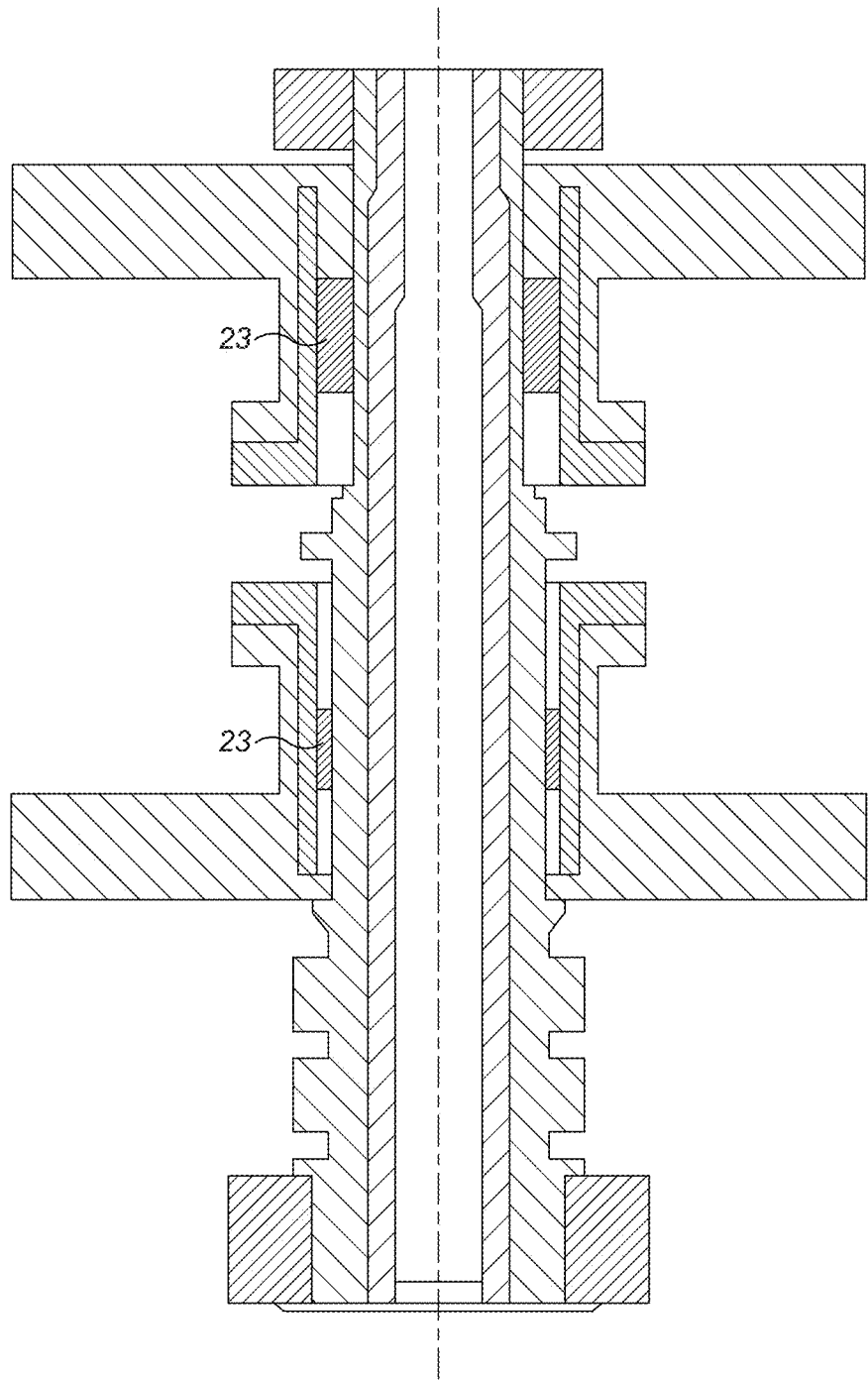
FIG. 10 shows an alternative solution to a bearing failure.

FIG. 10 shows the situation for bearing failure 6 of FIG. 4A where, again, redundancy can be provided with additional unloaded journal bearings 23.

Figure 11A:
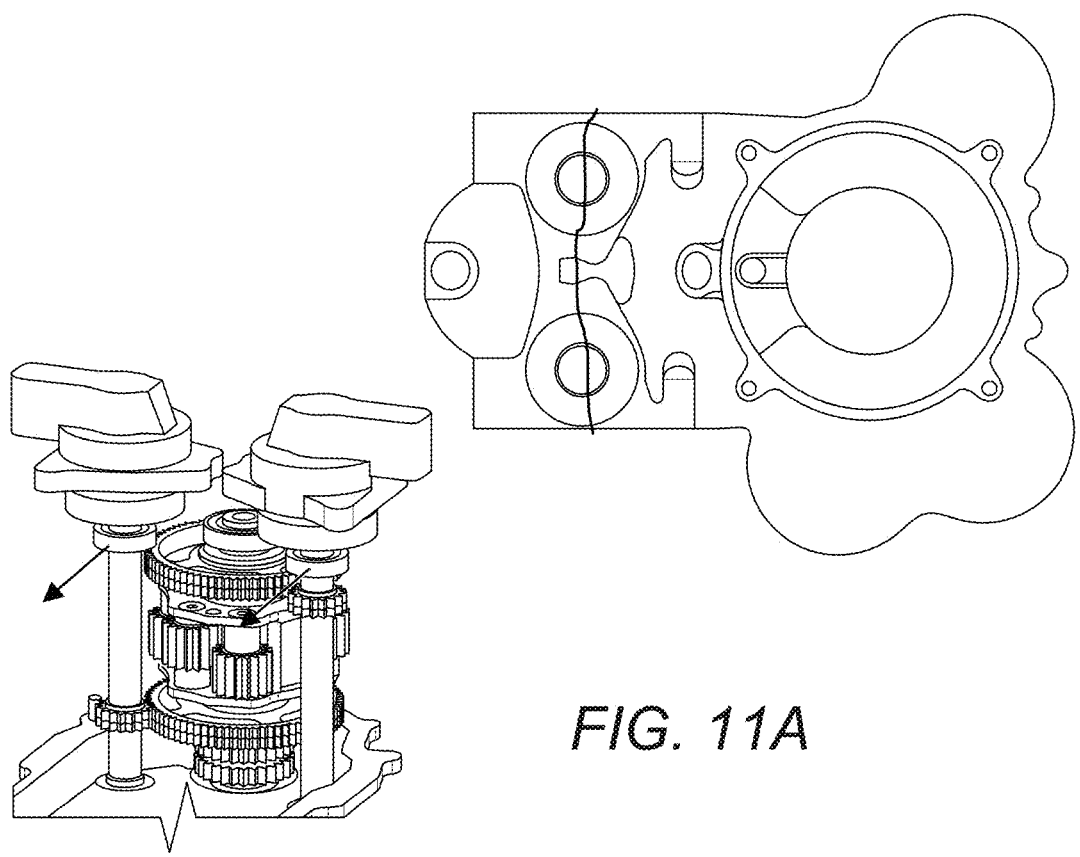
FIG. 11A is the view of FIG. 4 incorporation a solution of this disclosure to a crack in the casing.
Figure 11B:
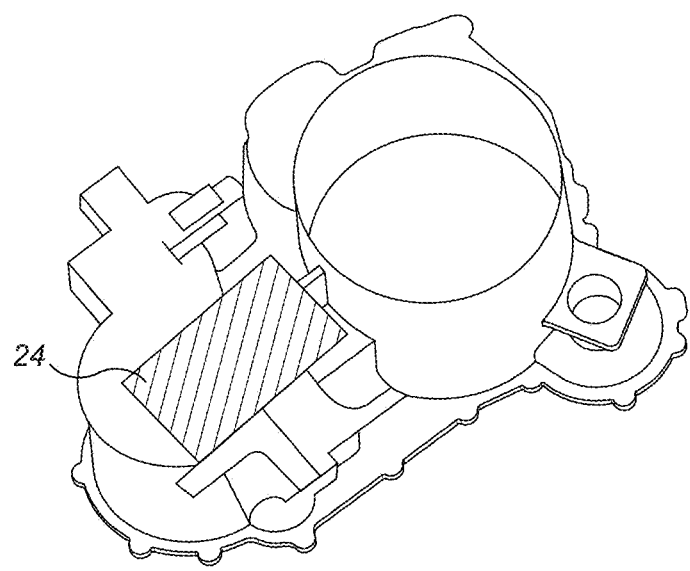
FIG. 11B is a perspective view of the solution of FIG. 11A.

FIGS. 11A and 11B show the situation providing redundancy for failure 7 of FIG. 4A where a crack could occur in the casing at the level of the POB 16. The solution shown in FIG. 11B is to provide redundancy by means of a bracket 24 across the top of the casing 14.

Figure 12A:
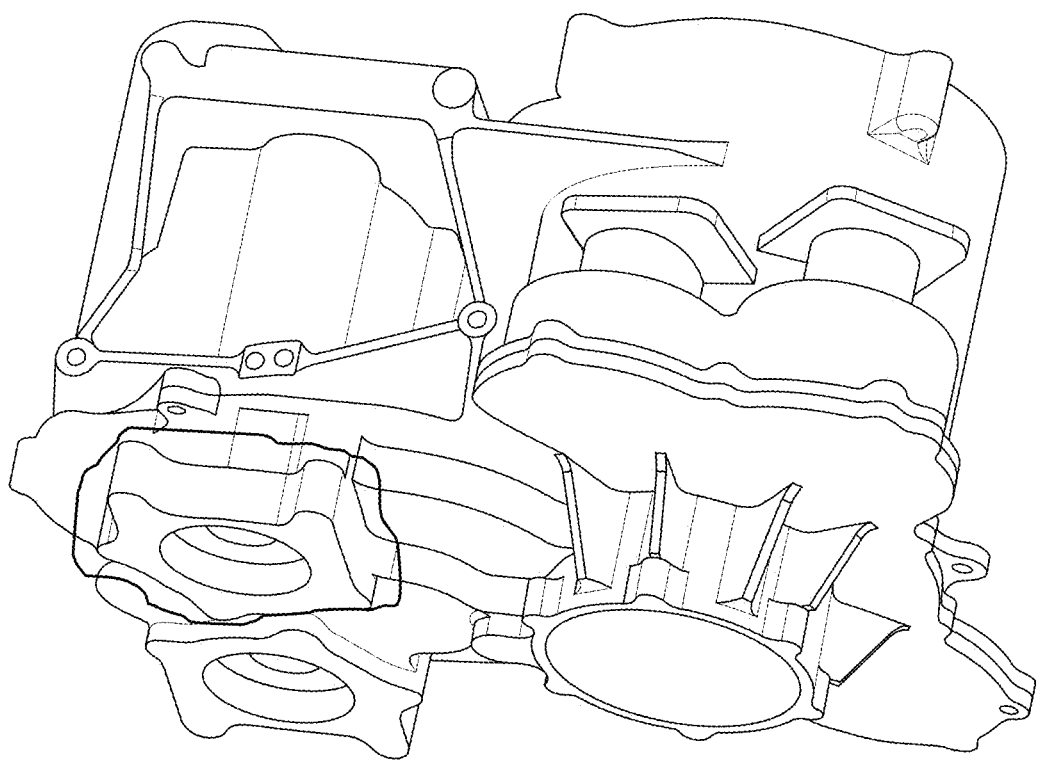
FIG. 12A is the view of FIG. 4 incorporation a solution of this disclosure to a crack in the casing.
Figure 12B:
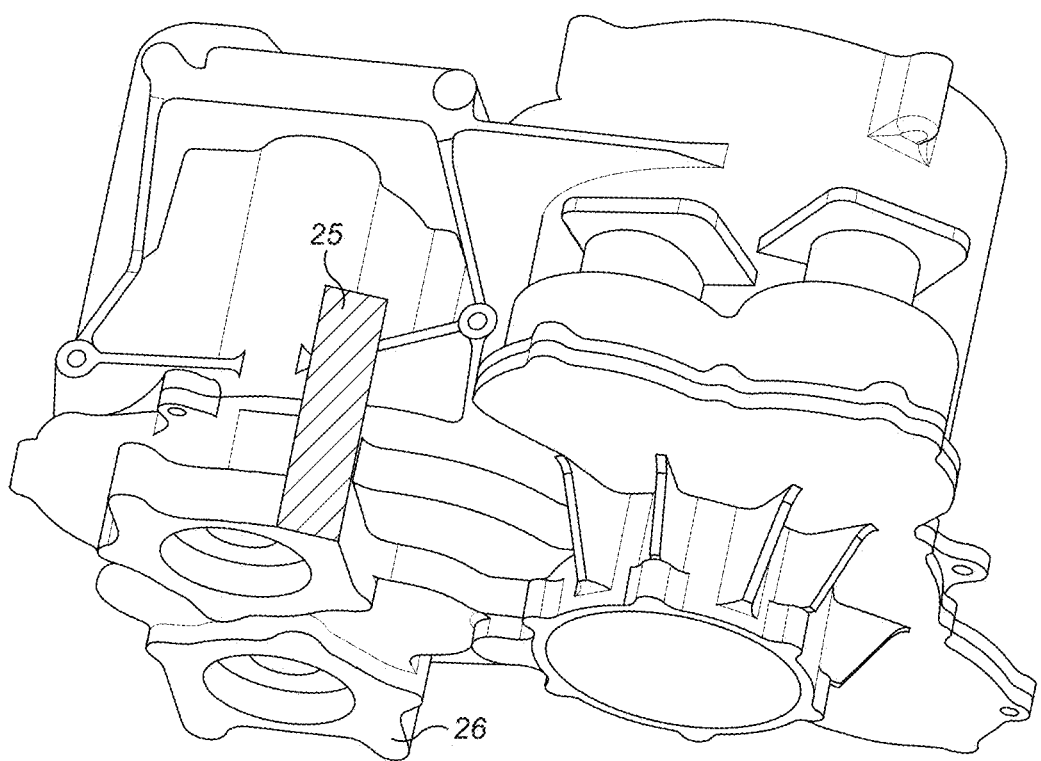
FIGS. 12B and 12C are perspective views of alternative solutions of FIG. 12A.
Figure 12C:
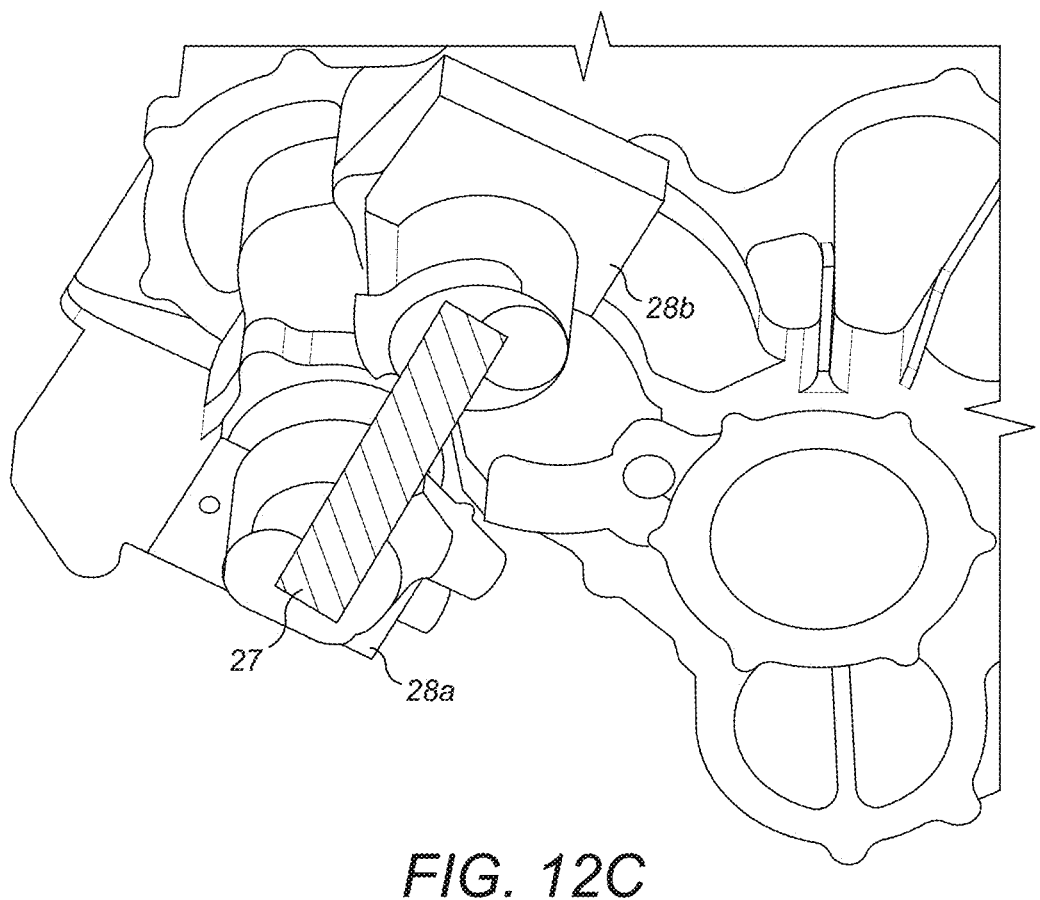

FIGS. 12A, 12B and 12C show the situation providing redundancy for failure 8 of FIG. 4A where a crack could occur in the casing at the level of the motor interface—i.e.

where the transmission input shafts 1,2 are. The solution shown in FIG. 12B is to provide redundancy by means of a bracket 25 linking the motor interface or cover 26 to the assembly casing. The alternative or additional solution shown in FIG. 12C is to provide a bracket 27 linking the two hydraulic motors 28a, 28b.

Figure 13A:
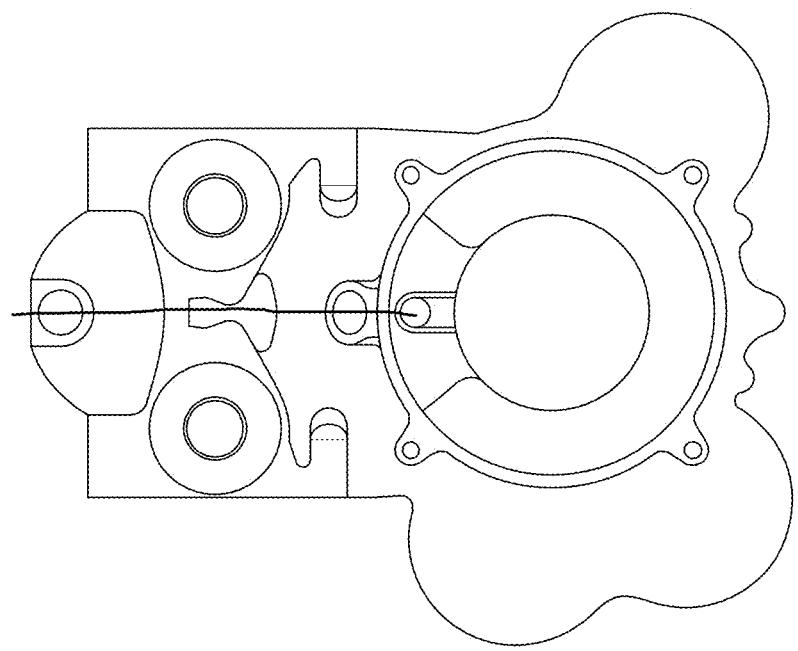
FIG. 13A is the view of FIG. 4 incorporation a solution of this disclosure to a crack in the casing.
Figure 13A:
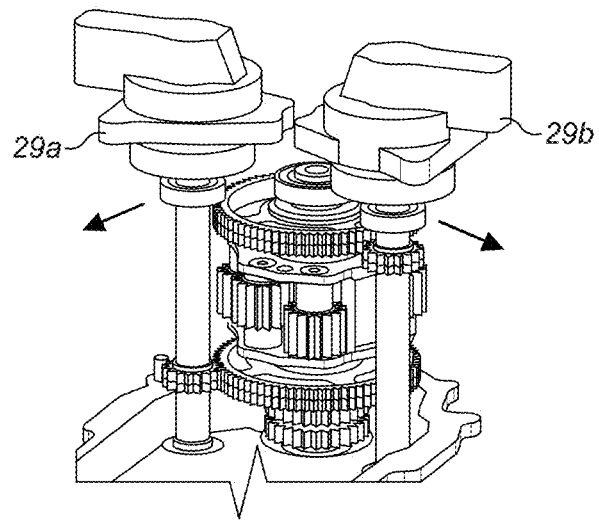
Figure 13B:
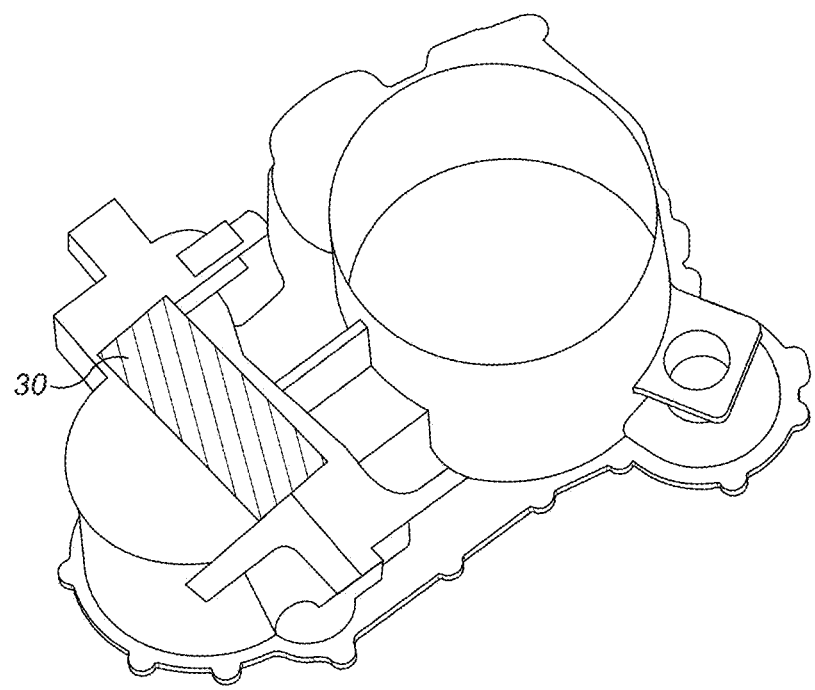
FIG. 13B is a perspective view of the solution of FIG. 13A.

FIGS. 13A and 13B show the situation providing redundancy for potential failure 9 of FIG. 4A of a longitudinal crack between the POB components 29a, 29b. The solution shown in FIG. 13B is to provide a bracket 30 linking the two components. An alternative or additional redundancy could be provided by a bracket (not shown) linking the parts of the casing providing the interfaces for the two POB components.

Figure 14:
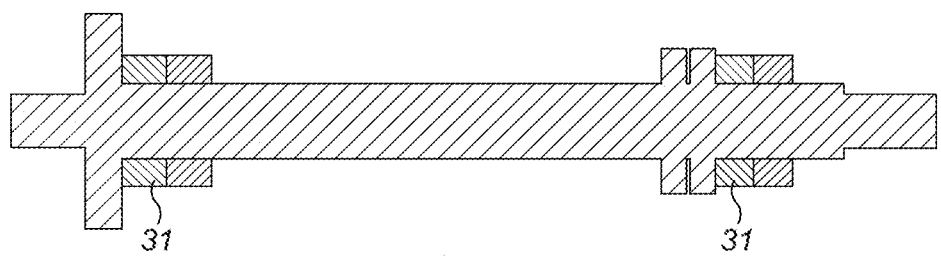
FIG. 14 shows a solution to a bearing failure.

FIG. 14 shows the situation for bearing failure 10 of FIG. 4A where, again, redundancy can be provided with additional unloaded journal bearings 31.

Figure 15A:
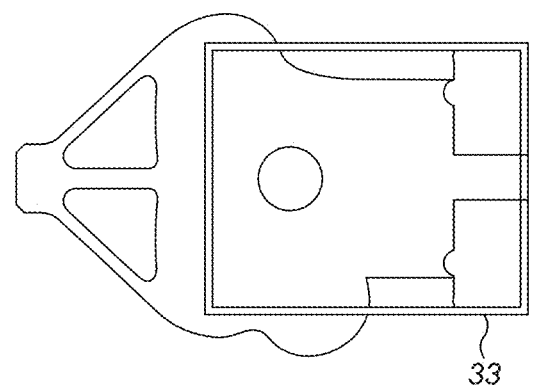
FIGS. 15A, 15B and 15C show solutions to different failures.
Figure 15B:
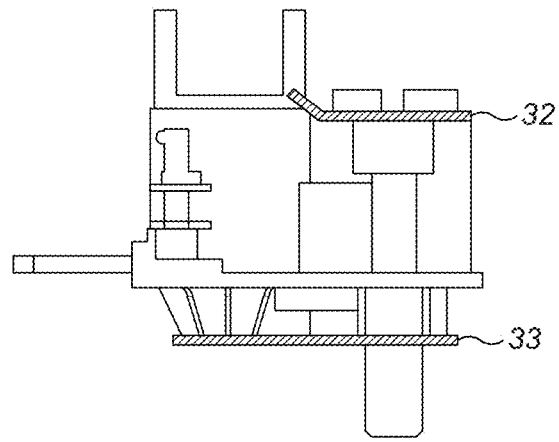
Figure 15C:
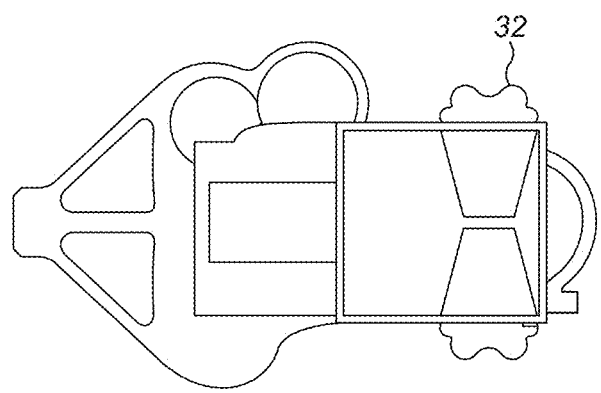

FIGS. 15A, B and C show alternative or additional locations for redundancy-providing brackets for the failures mentioned above. For failures 1, 2, 4, 7 and 9, for example, an upper external bracket 32 can be provided linking the NBB housing to the POB interfaces (FIGS. 15B and 15C). For failure case 8, a lower external bracket 33 can be provided linking the two hydraulic motors to a screw shaft bearing.

As discussed above, the purpose of the reinforcement components is to kick in to maintain transmission between parts of the assembly if a failure in connection between torque transmitting parts, such as a crack or fracture, occurs. The reinforcement components are, in normal circumstances, unloaded, i.e. do not perform any torque transmitting function between the assembly parts and only become loaded if a failure in the assembly occurs.

To ensure the reinforcement components are, in normal circumstances, unloaded, but ready to kick in in the case of failure, they are positioned such that there is a clearance between the reinforcement component and the assembly parts. The clearance is defined to have a minimum spacing from the assembly parts to ensure that the reinforcement component remains unloaded in normal circumstances—i.e. in the absence of a failure in the assembly parts even if there is some degree of deflection of the assembly parts under maximum load. Thus, for a given assembly, the degree of possible deflection under maximum load should be determined and the clearance should be set to allow that deflection to occur without the reinforcement kicking in or becoming loaded.

This positioning is described in more detail, by way of example only, with reference to FIGS. 16 to 19.

Figure 16:
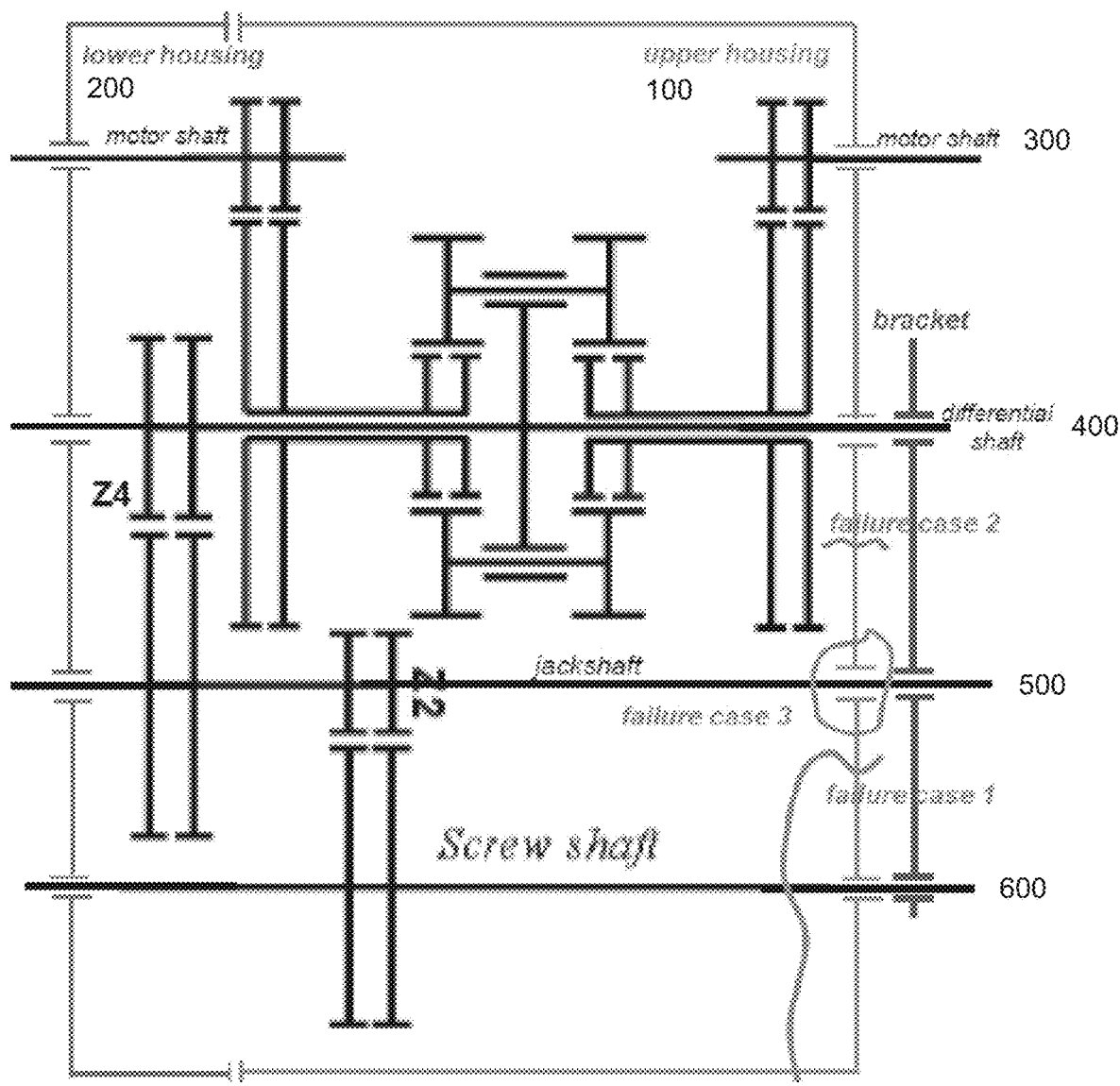
FIG. 16 is a schematic view of a gear box assembly showing where failures may occur.
Figure 17:
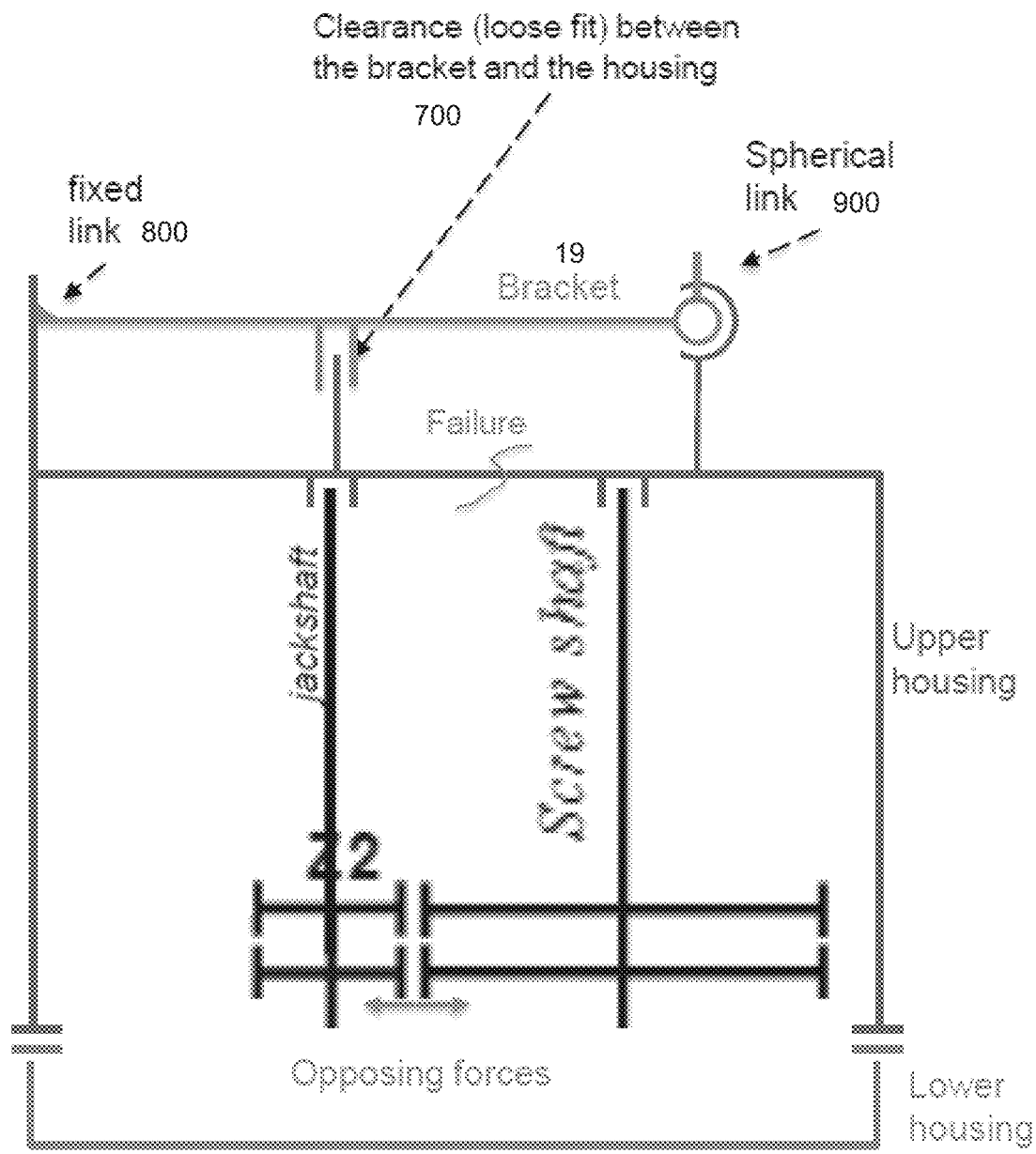
FIG. 17 is a schematic view of part of the assembly of FIG. 16 incorporating a bracket as a reinforcement component.

FIGS. 16 and 17 are referred to describe an example where the reinforcement component is a bracket.

FIG. 16 is a schematic view of a Gear Box Assembly in which the bracket function can be incorporated. This is similar to the assembly shown in FIGS. 1 to 6 and includes an assembly of shafts and gears as known in the art provided in a housing comprising an upper housing 100 and a lower housing 200. The assembly includes a motor shaft 300, a differential shaft 400, a jackshaft 500 and a screw shaft 600.

As previously discussed, failures can occur at various locations. For example, a failure can occur between the screw shaft and the jackshaft (case 1), between the differential shaft and the jackshaft (case 2), or in the jackshaft itself (case 3).

With reference to FIG. 17, a reinforcement component 19 (in this example a bracket) is provided such that when the assembly is 'healthy'—i.e. there is no crack or failure between transmitting parts—the bracket does not provide any reinforcement to the assembly—i.e. it is unloaded. This is achieved by designing the component or bracket 19 to have some clearance 700 between the bracket and the assembly parts. As mentioned above, the amount of clearance should be so as to allow normal or expected deflection of the housing parts under load without a crack or failure occurring. In the example shown, the unloaded state is also ensured by the manner in which the bracket is installed relative to the assembly parts. Here, the bracket is fastened by a fixed link 800 to one side of the assembly housing and is attached to the other side by a spherical link 900. In the case of a failure—in this example a crack in the upper housing between the jackshaft and the screw shaft—the opposing forces due to gear meshing will tend to push the jackshaft and the screw shaft away from each other. At this time, the bracket will kick in to keep the meshing transmission in place by holding both sides of the housing together.

Figure 18:
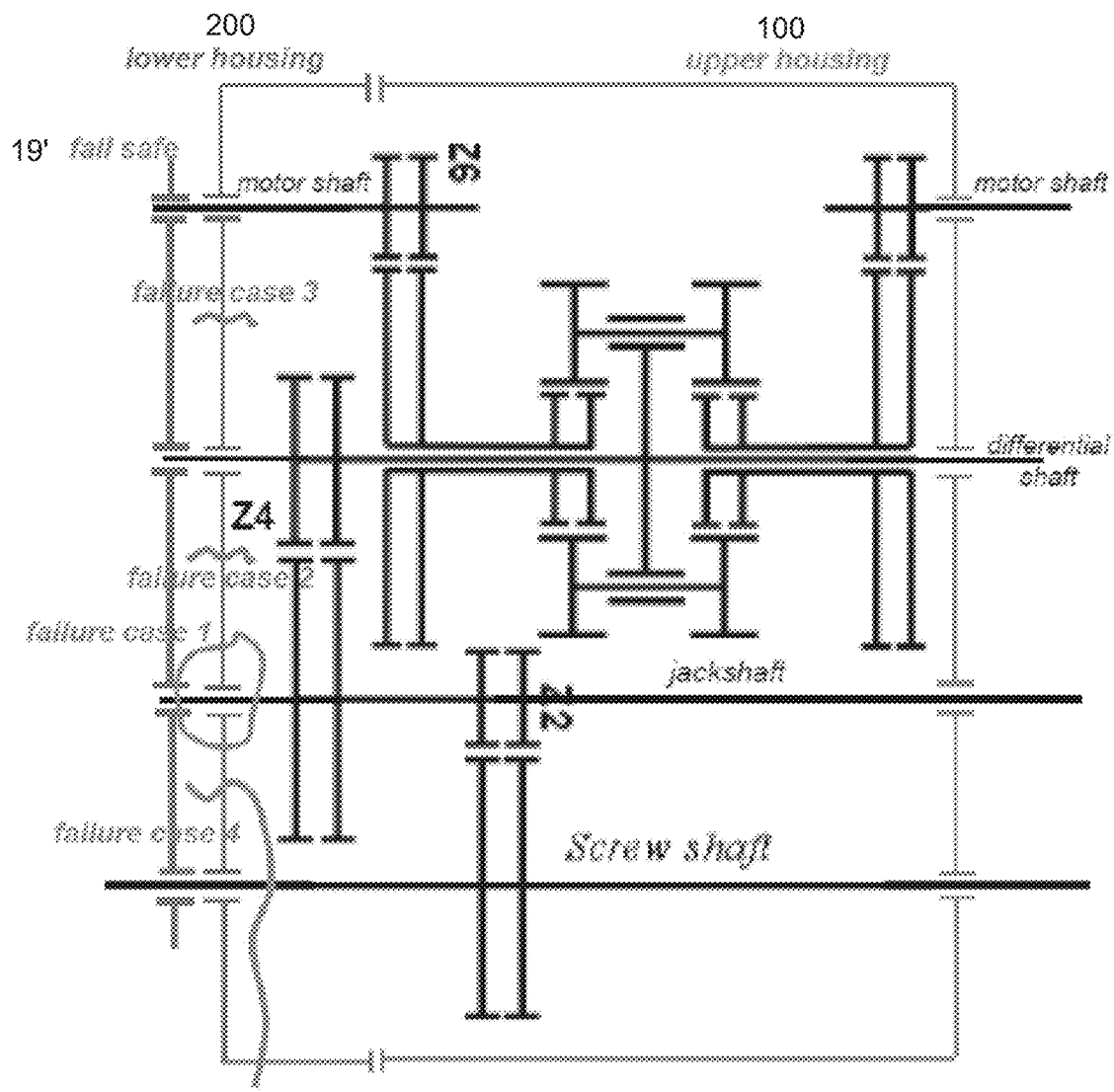
FIG. 18 is a schematic view of a gear box assembly showing where failures may occur.
Figure 19:
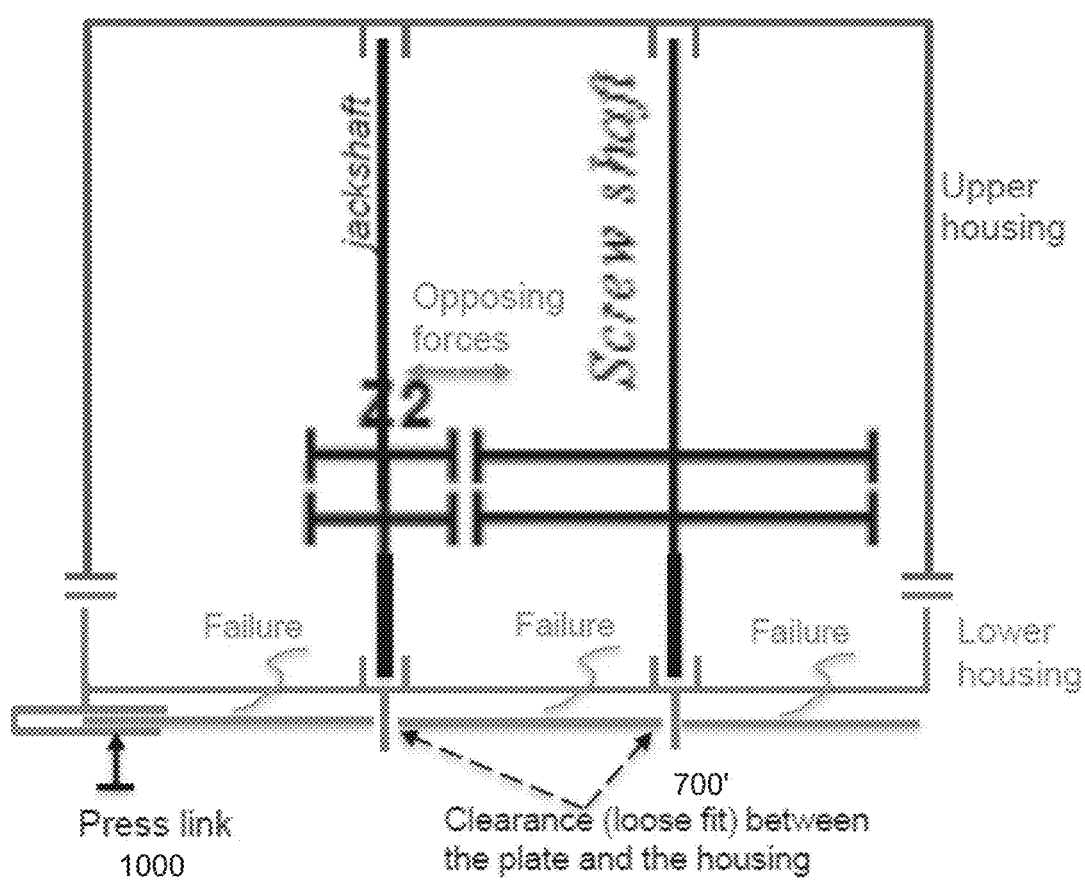
FIG. 19 is a schematic view of part of the assembly of FIG. 18 incorporating a fail safe plate as a reinforcement component.

In another example, described with reference to FIGS. 18 and 19, the reinforcement component is a fail safe plate 19' shown to prevent loss of transmission when a failure (e.g. crack or rupture) occurs on the lower housing 200. Again, the failure could be, for example, a jackshaft disconnect (case 1), a disconnect between the differential shaft and the jackshaft (case 2), a disconnect between the motor shaft and the differential shaft (case 3) or a disconnect between the screw shaft and the jackshaft (case 4). Again, the plate 19' is arranged such that when there is no failure in the assembly, no loading or reinforcement is provided by the plate, and the plate only kicks in if a failure occurs. Again, as shown in FIG. 19, the unloaded state is ensured by having a clearance 700' between the plate and the housing. As above, the amount of clearance should be so as to allow normal or expected deflection of the housing parts under load without a crack or failure occurring. The plate is fitted into the housing at a press link 1000, at one end. In the event of a failure, the opposing forces, again, will tend to push the jackshaft and the screw shaft away from each other. The plate will then come into play to hold both sides of the housing together and thus keep the meshing transmission in place.

Using the redundancy of this disclosure, safety of the system is improved without the need to add extra safety and maintenance checks.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A gearbox assembly comprising a plurality of component parts in torque transmission connection via gear, shaft and/or housing components; the assembly further comprising:
    an unloaded reinforcement bracket arranged to provide redundancy at selected locations where a crack would lead to loss of torque transmission between component parts of the assembly;
    wherein the unloaded reinforcement bracket is provided across two component parts and does not provide any reinforcement in the absence of the crack,
    wherein the unloaded reinforcement bracket is arranged such that in response to the crack being formed in a torque transmission path between the two component parts, the unloaded reinforcement bracket becomes loaded to provide torque transmission between the two component parts.

2. A gearbox assembly as claimed in claim 1, wherein said component parts include a plurality of gear stages each comprising a shaft and one or more toothed wheels via which the gear stages are connected, and a plurality of gearbox assembly housing components.

3. A gearbox assembly as claimed in claim 2, wherein the bracket is fixed between at least two of any of the shafts, the toothed wheels and the housing components.

4. A gearbox assembly as claimed in claim 3, comprising a differential line gear stage in torque transmitting engagement with a jackshaft and a housing component enclosing the differential line gear stage and the jackshaft, and wherein the bracket is provided across the housing components.

5. A gearbox assembly as claimed in claim 3, comprising a differential line gear stage in torque transmitting engagement with an input shaft and a housing component enclosing the differential line gear stage and the input shaft, and wherein the bracket is provided across the housing components.

6. A gearbox assembly as claimed in claim 2, comprising a bull gear in torque transmitting engagement with a jackshaft and a housing component enclosing the bull gear and the jackshaft, and wherein the unloaded reinforcement bracket comprises a bracket across the housing components.

7. A gearbox assembly as claimed in claim 6, comprising a differential line gear stage in torque transmitting engagement with a jackshaft and a housing component enclosing the differential line gear stage and the jackshaft, and wherein the bracket is provided across the housing components.

8. A gearbox assembly as claimed in claim 6, comprising a differential line gear stage in torque transmitting engagement with an input shaft and a housing component enclosing the differential line gear stage and the input shaft, and wherein the bracket is provided across the housing components.

9. A gearbox assembly as claimed in claim 2, comprising a differential line gear stage in torque transmitting engagement with a jackshaft and a housing component enclosing the differential line gear stage and the jackshaft, and wherein the bracket is provided across the housing components.

10. A gearbox assembly as claimed in claim 2, comprising a differential line gear stage in torque transmitting engagement with an input shaft and a housing component enclosing the differential line gear stage and the input shaft, and wherein the bracket is provided across the housing components.

* * * * *